United States Patent [19]
Uetsuki et al.

[11] 3,892,490
[45] July 1, 1975

[54] MONITORING SYSTEM FOR COATING A SUBSTRATE

[75] Inventors: Toshio Uetsuki; Mitsuo Okajima, both of Osaka, Japan; Yoshio Yuasa, Redondo Beach, Calif.

[73] Assignee: Minolta Camera Kabushiki Kaisha, Osaka, Japan

[22] Filed: Mar. 6, 1974

[21] Appl. No.: 448,683

[52] U.S. Cl.................................. 356/161; 250/560
[51] Int. Cl. .......................................... G01b 11/00
[58] Field of Search ............. 356/108, 161; 209/82; 250/559, 560; 350/164, 175; 65/60

[56] References Cited
UNITED STATES PATENTS
3,824,017   7/1974   Galyon........................... 356/161 X
3,846,165   11/1974  Ettenberg et al. .................. 117/201

OTHER PUBLICATIONS
IBM Tech. Discl. Bltn., Vol. 13, No. 12, May '71 – "Multilayer Optical Thickness Monitor," by Esaki et al., pg. 3698-3699.

Primary Examiner—Ronald J. Stern
Assistant Examiner—Paul K. Godwin
Attorney, Agent, or Firm—Jackson & Jones Law Corporation

[57] ABSTRACT

A monitoring system and method of producing a multi-layered coating such as a non-classical anti-reflecting coating on a substrate such as an optical lens is provided. The substrate is coated with material in a sealed housing. A beam of energy such as light having a variable wavelength across a predetermined range is directed to contact the coating material on the substrate. A portion of the beam is monitored after it contacts the coating material to provide a plurality of corresponding monitoring signals indicative of the optical thickness of the coating. The monitoring signals are compared with a predetermined range of values corresponding to the desired optical thickness. When all of the monitoring signals are respectively matched with the predetermined values, the deposition of material is stopped. The predetermined values and the monitoring signals can be simultaneously displayed on a visual display screen for comparison by an operator. The beam of energy can be monitored before it contacts the coating material and the resulting signal can be compared through a differential amplifier with the resulting monitoring signals to insure that any fluctuations in the energy source will not influence the monitoring signals. Alternatively, the beam can be filtered to provide a derivative single monitoring wavelength beam varying from the design wavelength that would provide an extreme limit of reflection for the desired optical thickness.

19 Claims, 15 Drawing Figures

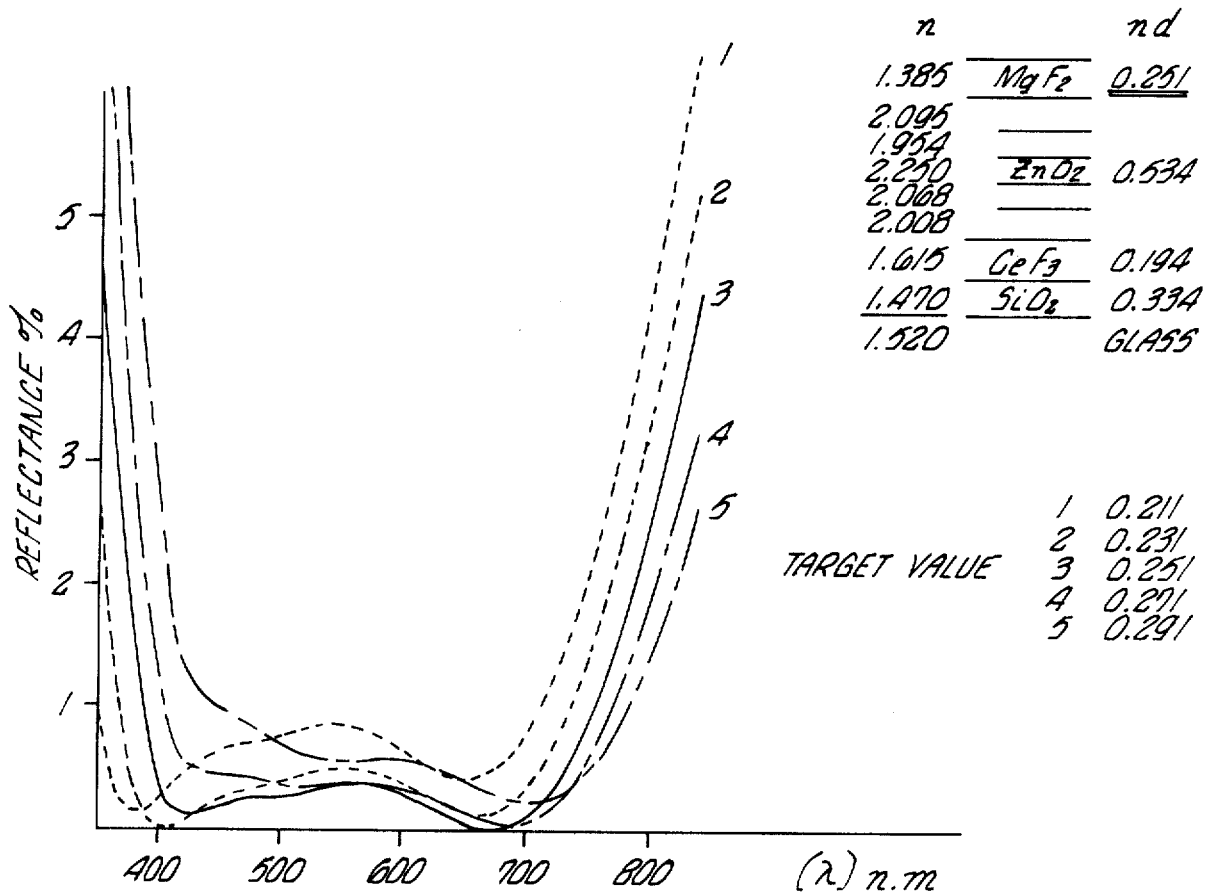
FIG_9.

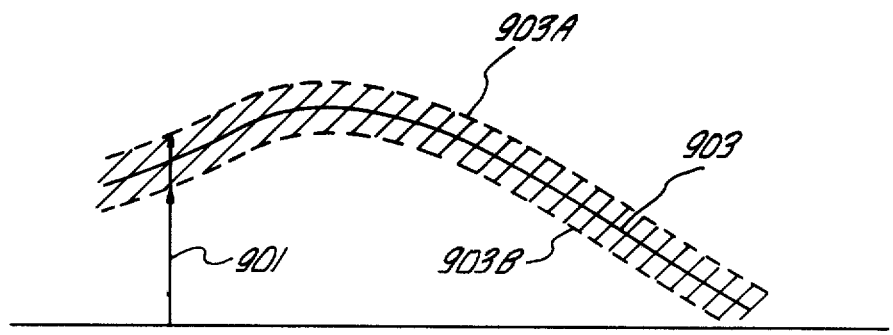
FIG_11_
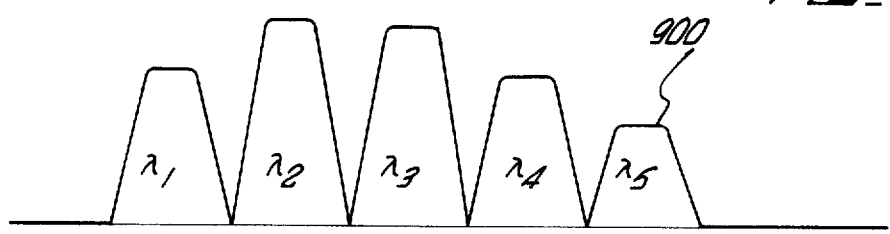
FIG_10_
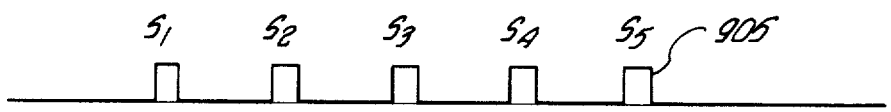
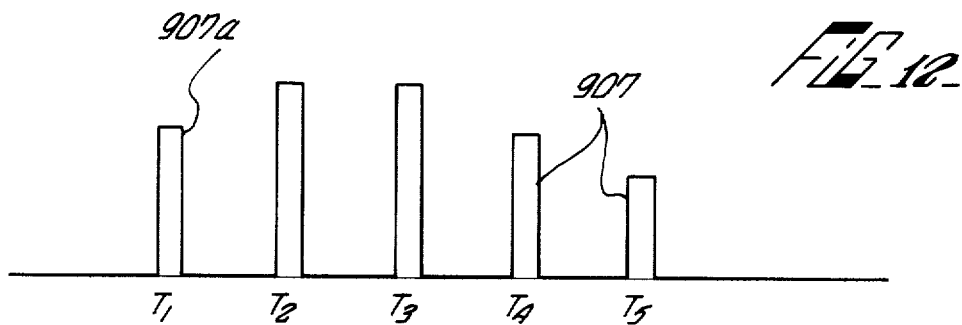
FIG_12_
FIG_13_

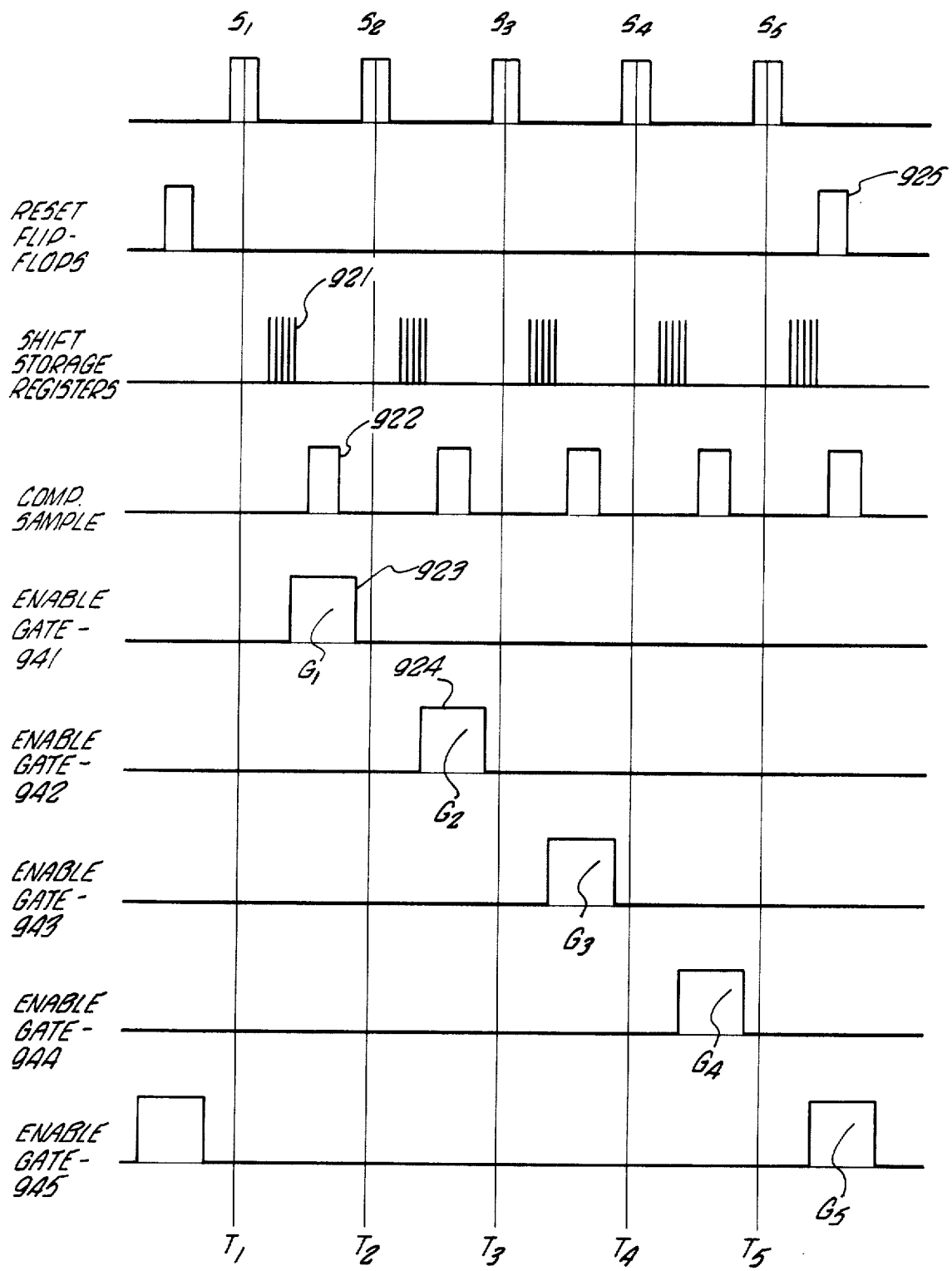

MONITORING SYSTEM FOR COATING A SUBSTRATE

BACKGROUND OF THE INVENTION:

1. Field of the Invention:

The present invention is directed to an apparatus and method of monitoring the application of coating layers to a substrate and more particularly, to monitoring the application of multi-layer anti-reflective optical coating to an optical substrate.

2. Description of the Prior Art:

Multi-layer anti-reflection coatings are well known to those skilled in the optics art for reducing the reflection of energy off of a substrate. The vacuum evaporation process of applying anti-reflective layers to a substrate has been utilized for a considerable number of years. One of the prime utilizations of anti-reflective coatings has been in the optics field for reducing the reflectance of light over the entire visible spectrum especially in cameras and the like.

While the use of single and double layers of anti-reflecting coatings have been extremely popular, there has been a recent demand for a more precise control of the reflectance, particularly with respect to color photography. To meet this demand, multi-layer anti-reflection coatings utilizing three or more layers have been provided such as in U.S. Pat. No. 3,185,020 and U.S. Pat. No. 3,604,784. These multi-layer anti-reflective coatings have greatly improved the desired optical characteristics over the single and double layer coatings at the cost of complicating the manufacturing problems associated with the depositing of an anti-reflective layer on the lenses.

A multi-layer anti-reflective coating such as a three layer coating will utilize a first layer next to the air or medium to minimize the reflectance. This layer will generally have a low refractive index with an optical thickness of one quarter design wavelength. The second layer will have a high refractive index and will be generally one half wavelength in optical thickness. The half wavelength optical thickness will not alter the optical characteristics of the other layers and will have no effect on the residual reflectance. The half wavelength will broaden or expand the anti-reflection effect of the total coating on both sides of the design wavelength. The third layer adjacent the substrate will have a medium refractive index and an optical thickness that will be of a three quarter or one quarter design wavelength in optical thickness.

In utilizing multi-layer coatings, production problems occur for a number of reasons. Frequently, the individual layers of the anti-reflective coatings will be extremely thin and very often 300 angstroms thick. This creates obvious problems of controlling the precise optical thickness. In utilizing commercial material having a high or medium index of refraction, it is generally necessary to utilize either a metal oxide or a fluoride. Both of these materials are frequently found to be inhomogeneous and unstable with respect to their refractive indices.

In addition to the problems associated with the variance in indices of refraction for medium and high refractive indexed material, there are additional problems such as graded indices in metal oxides and aging effects wherein the coating will show a different optical thickness when exposed to air as compared to its optical thickness in the vacuum.

Recently, it has been proposed to utilize four layers of different evaporative materials to provide a superior result over that of the triple layer structures. An example of this four different material coating is disclosed in U.S. Pat. No. 3,463,574. While optical improvements have been achieved, production problems such as evaporation and the precise control of the layer thicknesses are multiplied.

Generally, the designs of anti-reflection coatings in the prior art have relied upon a classical design solution utilizing a multiple quarter wavelength structure as represented by the Jupnik solution, set forth in "Physics of Thin Film," Volume 2, page 272, G. Hass and R. E. Thun, Academic Press, New York, New York. In using this mathematical approach to a multi-layer anti-reflection coating such as a four layer coating structure having, for example, an optical thickness of $\lambda14$, $\lambda/2$, $\lambda/4$, $\lambda/4$, it has been found that the respective refraction indices of the layers must be proportionately represented by $N_1 N_4 = N_3 \sqrt{N_s N_o}$, where $N$ represents the index of refraction and $N_4$ would be the index of refraction adjacent the substrate having an index of refraction of $N_s \cdot N_o$ is the index of refraction of the medium such as air.

In the coating layer designs based on the classical solution, there is little tolerance either for manufacturing errors or in deviation from the theoretical index of refraction of the various materials.

The conventional vacuum coating apparatus such as disclosed in U.S. Pat. No. 2,784,115 and U.S. Pat. No. 3,604,784 utilize a chamber such as a bell jar for maintaining a vacuum. A mounting device is provided in the bell jar for holding a plurality of the substrates that are to be coated. Generally, the substrates are heated and the vacuum is adjusted to the optimum condition. A specimen of layer material is evaporated by an electron beam from an electron gun. The deposition of the particular layer is generally monitored by a source of light of the particular design wavelength, e.g., 510 nanometers, that is reflected at a set angle onto a collector such as a photo-conductive element. Since most multi-layer anti-reflective coatings are based on a classical design solution, the deposition of material is simply halted when the collector registers either the minimum or maximum level of light reflectance. After the final layer is deposited, the substrates are allowed to cool and are removed from the vacuum coating system. Alternatively, standard film layers of various known thicknesses can be compared with the film layer being deposited by reflecting light off of both of the films.

One method of controlling the optical thickness of a dielectric film has been developed by Giacomo and Jacquinot, OPTICAL PROPERTIES OF THIN SOLID FILMS, O.S. HEAVENS, DOVER PUBLICATIONS, INC., NEW YORK (1965). The spacer layer of an interference filter designed to isolate a spectral line had presented particular monitoring problems. In such a filter, the center of the transmission band needs to be located with relatively high precision. The method of monitoring this spectral line was accomplished by varying a monitoring wavelength over a small range with a frequency $(f)$ and measuring the output current from a photo-cell. An adjustable knife edge was oriented to shape the image area. When the film had a $\lambda_0/4$ optical thickness corresponding to a maximum or minimum of reflection or transmission of the mean value design wavelength $\lambda_0$ the photo-cell total output current would have its frequency current component reduced to zero.

It is also known in the evaporation of a film layer to form a band pass heat filter to utilize a pair of constant monitoring wavelength beams to measure both extremes of the band wavelength with a respective monitoring beam.

SUMMARY OF THE INVENTION

The present invention is directed to a monitoring system for accurately depositing a layer or series of layers of material on a substrate. The system includes a source of energy having a variable wavelength across a predetermined range of values. The energy, which can be in the form of visible light, is directed towards the layer being deposited on the substrate. Detector equipment receives a portion of the energy after it has contacted the substrate and provides corresponding signals representative of the wavelength range. Apparatus is provided for comparing the corresponding signals with a predetermined range of values representing the desired thickness of material. Compensation equipment is provided to insure a constant reference level of the source of energy while a visual display screen can be utilized.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS:

FIG. 9 is a plot of a series of curves of percent reflectance against wavelength across the visual spectrum;

FIG. 10 is a schematic of waveforms for various filters of wavelengths $\lambda_1$ to $\lambda_5$;

FIG. 11 is a schematic of an envelope of curves for a target value;

FIG. 12 is a schematic of a signal waveform;

FIG. 13 is a schematic of an analog waveform having varying amplitudes corresponding to sampling times $T_1$ to $T_5$;

FIG. 15 is a graph of timing pulses for the comparison circuit of FIG. 14.

Figure 1:
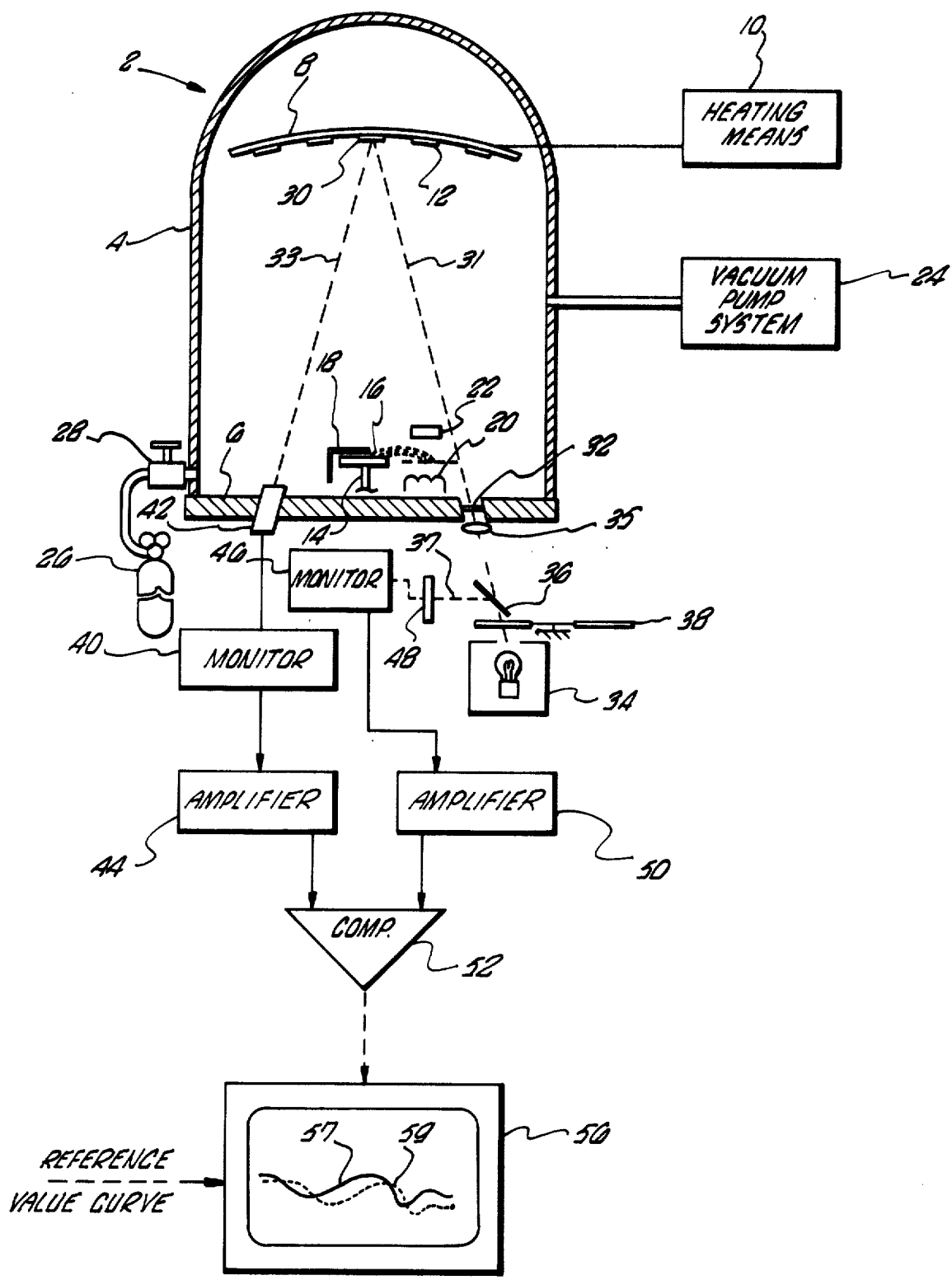
FIG. 1 is a schematic drawing of a vacuum coating monitoring apparatus embodying the principles of the present invention.

DESCRIPTION OF THE PREFERRED EMBODIMENT:

Referring to FIG. 1, a vacuum coating apparatus 2 for depositing layers of coating on an optical substrate is disclosed. A vacuum chamber or bell jar 4 is appropriately sealed to a base plate 6. Mounted within the bell jar 4 is a substrate holder 8. The substrate holder 8 is generally spherical and positions substrates 12 tangentionally to the holder 8. A rotary substrate holder could be utilized particularly with larger diameter substrates. The substrate holder 8 has a conical shape to maintain an even distance across its surface to the evaporative material source 16. The substrate holder 8 is connected to heating means 10 (schematically shown) capable of heating various substrates 12, which are usually glass lenses, to the optimum temperature for receiving evaporative material.

The evaporative material can be mounted on a revolving material holder 14. The appropriate material source 16 can be exposed to the action of an electron beam through a shield member 18. The electron beam can be generated from a number of conventional sources such as an electron emitting filament 20 which is aimed or directed towards the source 16 of the appropriate coating material by an electro-magnet 22. Other methods of evaporating the material can be used including a sputtering technique. A shutter and fan (not shown) will generally be used in the conventional manner.

The bell jar 4 is evacuated by a vacuum pump system 24 which in actual practice usually comprises a series of pumps in fluid connection to the inside of the bell jar 4. The vacuum pump 24 is capable of producing a vacuum greatly in excess of $5 \times 10^{-5}$ torrs.

Oxygen gas can be monitored in to the bell jar 4 from an oxygen tank 26 through a throttle valve 28. The oxygen stream can be directed, for example, towards the substrate holder 8.

A test specimen or monitoring substrate 30 is positioned on the substrate holder 8. The relative position of the test substrate 30, material source 16 and monitoring equipment are only illustratively shown in FIG. 1 and are not intended to be limiting with respect to an optimum placement of this equipment. If desired, a single monitoring substrate for each individual layer of coating can be used.

The base plate 6 mounts a window 32 that passes a light beam 31 emitted from the light source 34 generally through a restricted passage or pin hole. A beam splitter 36 or, if desired, light chopper, removes a portion 37 of the light source 34 to provide a reference control of any fluctuations in the intensity of the light source 34 as will be more fully disclosed with reference to FIG. 2. A series of monitoring filters 38 can be rotatably mounted to position a desired filter in the path of the light emitting from the light source 34. The filters are preferably interference filters to give an extremely sharp or narrow wavelength. The monitoring filters 38 could alternatively be positioned in front of a conventional photoconductive monitor 40 in lieu of the placement disclosed in FIG. 1.

Figure 2:
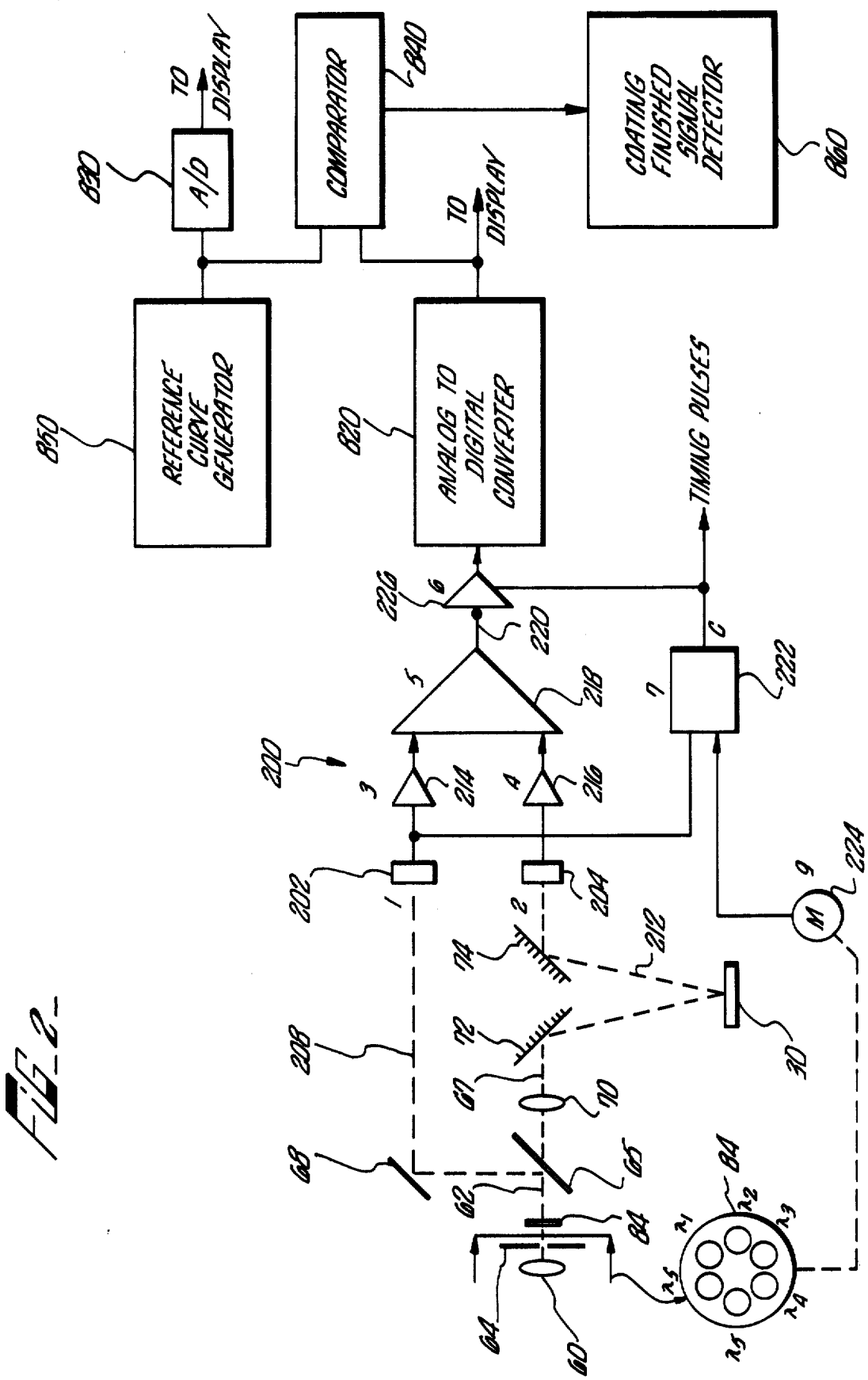
FIG. 2 is a schematic drawing of an alternative vacuum coating monitoring apparatus of the present invention.

A collimating lens system 35 can be used to focus the filtered light on the test substrate 30. Basically, the monitor 40, as will be explained more fully with reference to the embodiment in FIG. 2, is adapted to measure the reflectance from a test substrate 30. The photo-conductive detector 40 receives the reflected light after it passes through a diffuser 42. The detector or photo-multiplier circuit 40 serves to provide an electrical signal that is representative of the light impinging or received by the detector. The test substrate 30 provides a representative indication of the amount of deposited material on each of the substrates 12 of a single batch. The photo-conductive detector 40 can be any of the type known in the prior art. Appropriate amplifier circuits may be connected to receive the electrical signal provided from the photo-monitor 40 to appropriately amplify the electrical signal for subsequent processing. Obviously, if no amplification is required then the amplifier may be omitted to satisfy the requirements of the system. An amplifier 44 is connected to the photo-conductive detector 40 and amplifies the electrical signal corresponding to the reflected light.

Another monitor 46 can be utilized to receive the reference control portion 37 of the light source 34 and provide a corresponding electrical signal indicative of the intensity of the reference source 34. A diffuser 48 can be utilized to disperse the light to render it more easily detectable by the monitor 46. An amplifier 50 is connected to the photo-conductive detector 46 to amplify the electrical signal.

The purpose of the reference light beam 37 is simply to insure that any fluctuations in the intensity of the light source 34 will not be ultimately received as a variation in reflection from the substrate 30. The amplifiers 44 and 50 can be of the log amplifier circuit type to provide outputs such as a voltage which is a logarithmic function of the input signal. Various logarithmic circuits are well known in the prior art to compensate for variations in operational conditions and reference is made to U.S. Pat. No. 3,724,954 as illustrative of such logarithmic circuits.

The photo-detector 40 receives the reflectance or monitoring light signal 33 which is indicative of the light beam reflected from the substrate 12 and converts it into a corresponding electrical signal. The log amplifier circuit 44 provides a representative output such as a voltage which is a logarithmic function of the input signal. The differential amplifier circuit or comparator 52 receives the input signals from the log amplifier circuits 44 and 50 and provides an output at its terminal which is a function of:

$$X = K \log^M/R$$

where

K is a calibration constant
M is the monitored output signal
R is the reference output signal.

This effective ratio signal at the output terminal compensates for any fluctuations in the intensity of the light source 34 and thereby guarantees a true measurement of reflectance from the test specimen 30.

The subsequent processing of the output signal either by a computer and/or a display system 56 will be more fully disclosed with respect to FIG. 2.

In depositing source material 16 on the substrates 12 and test substrates 30, the conventional process dealing with the classical optical quarter wavelength design would utilize a single monitoring filter to provide a set design wavelength. Generally, the design wavelength would be 510 nanometers for color photographic lenses.

In the classical optical quarter wavelength design of thin layer films, the reflectance for a particular anti-reflective coating will have a minimum reflection at the design wavelength and at its integer magnified wavelengths. The photo-conductive detector would be utilized to measure the total reflectance. Due to the reliance upon the restrictive classical quarter wavelength design approach, the amount of material deposited for any particular layer would be controlled primarily by the maximum or minimum reflectance received by the photo-conductor. Thus, a layer of material will be deposited on a substrate until, for example, either the maximum or the minimum reflectance is recorded by the photo-conductor. A graph of the reflectance versus thickness would be primarily cyclic at the integer magnified wavelengths of the design wavelength.

In one embodiment of the present invention, as will be more fully disclosed subsequently, the monitoring wavelengths can be varied in accordance with a non-classical wavelength design. In this non-classical design approach, the optical designer is capable of adjusting the optical thickness of the various layers to compensate for deviations from his design parameters such as variances in the index of refraction and graduated or graded index structures in a coating layer, reference is made to U.S. Pat. No. 3,781,090 issued Dec. 25, 1973, for a full, detailed description of the non-classical optical design, the subject matter being incorporated herein by reference.

Basically, the non-classical optical design introduces non-quarter optical wavelength structures into one or preferably more layers of the coating design. Using a vector approach to coating design such as used on the Jupnik's solution, set forth in "Physics of Thin Film," Volume 2, page 272, by G. Hass and R. E. Thun, Academic Press, the length of each vector is related to the Fresnel coefficient which is a simple function of the refractive index. The direction of each vector is a function of the optical thickness. With the classical solution of the quarter wavelength, the phase angle or vector direction will be an integer multiple of $\pi$ and the vectors will terminate on the real axis only. To achieve a vector summation in the classical design, the refractive indices of the coating will be restricted by the relationship $N_1 N_4 = N_3 \sqrt{N_s N_o}$.

In the non-classical optical design, the vectors do not end on the real axis; but rather in the imaginary plane. The Fresnel coefficients can then be adjusted by the phase angle in order to terminate the vector summation at the origin for a graphic solution.

Thus, as an example, for a four layer anti-reflecting coating designed by the non-classical approach it would be possible to have two separate solutions to meet the design requirements, that is:

1. When the third layer is thicker than $\lambda/4$, then the fourth layer will be thinner than $\lambda/4$, and
2. when the third layer is thinner than $\lambda/4$, then the fourth layer will be thicker than $\lambda/4$.

As can be readily understood, the flexibility of this non-classical design approach in permitting optical thickness compensation to meet the design parameters provides the optical designer with a significant advancement in the art.

As a practical matter, an anti-reflecting coating must be designed not for just one wavelength but for the entire visual spectrum, especially in color photography. Thus, it is desirable to minimize the reflectance in as broad a range as possible, e.g. the entire visual spectrum range 400 ~ 700 nm.

Utilizing the above approximate solution, and a computer, the non-classical optic design can be optimized. The technique utilized with the computer is the so-called damped least square method. That is to minimize the quantity defined by:

$$Q = \sum_{\lambda=400}^{\lambda=700} W(\lambda) |R(\lambda) - R^*(\lambda)|^2$$

where $W(\lambda)$ is a weighting factor, and $R^*(\lambda)$ is a target value of reflectance.

As an example of selection parameters that can be utilized:

$\lambda$: 450 ~ 650$^{nm}$, $R^*(\lambda) = 0$, and a large $W(\lambda)$.
$\lambda$: 400 ~ 450$^{nm}$ and 650 ~ 700$^{nm}$, $R^*(\lambda) = 0.5\%$, but having a small $W(\lambda)$.

Due to the non-quarter wavelength design, it is possible to compensate the reflectance with respect to refractive index variations by thickness adjustments of the layers of coating.

While in any optical design there will be optimum values for a relatively high refractive index layer and a relatively middle range refractive index layer for a particular substrate, it has been often found in practice that the particular materials are not available or practical commercially or the subsequent evaporated film layer will have an index of refraction which will fluctuate from the theoretical value. With the non-classical design it is possible to compensate for these variations and produce a commercial optical coating.

Since coating layers can vary from the classical quarter wavelength design restrictions, one embodiment of the present inventive process adjusts the particular monitoring wavelength for each layer to permit the use of the conventional monitoring process to determine the maximum or minimum reflectance desired. This reflectance is indicative of the optical thickness deposited with respect to a single material source 16.

For example, 510 nanometer wavelength can still be utilized as the basic design criterion but the actual monitoring design wavelengths during the depositing step are varied to accommodate the non-quarter wavelength optical thickness and still provide a measurable maximum or minimum reflectance. As known in the prior art, an exact measurement of the quantity of lumens is difficult but the measurement of a maximum or minimum point being relative is much more accurate. Accordingly, by selecting the appropriate monitoring wavelengths for each non-classical layer in the coating of the present invention, it is possible to measure either the minimum or maximum point to control the optical thickness of that layer.

To illustrate the process of the first embodiment of the present invention, a four layer anti-reflection coating of a non-classical design will be selected where the optical thicknesses and index of refractions are:

TABLE I

| Optical Thickness | Index of Refractions |
|---|---|
| $N_1 d_1 = 0.250 \lambda_0$ | $N_1 = 1.385$ |
| $N_2 d_2 = 0.500 \lambda_0$ | $N_2 = 2.150$ |
| $N_3 d_3 = 0.204 \lambda_0$ | $N_3 = 1.615$ |
| $N_4 d_4 = 0.385 \lambda_0$ | $N_4 = 1.385$ | with the subnumbers referring to the various layers starting from the air interface layer (1) to the layer (4) adjacent the substrate of glass, $N_s = 1.52$. The ultimate design wavelength for the coating is $\lambda_0 = 510$ nm.

The appropriate material source 16 is positioned operatively beneath the shield member 18. The electron emitting filament 20 is activated when the vacuum pump system 24 has evacuated the bell jar 4 to the appropriate pressure level.

The parameters of the illustrative four layer antireflection coating have been picked to illustrate the extremes of depositing material on a substrate. In this regard, the first layer (4) deposited adjacent the substrate of the glass is of such an optical thickness that a simulated half wavelength appropriate monitoring wavelength would place that monitoring wavelength beyond the visual spectrum. Since the reflectance starts out with a maximum peak on the deposition of the material source 16, an attempt is made to select a monitoring wavelength $\lambda_i$ based on a half wave cycle to permit the monitoring equipment to stop the depositing of material at the next peak reflectance.

The monitoring wavelength $\lambda_i$ is selected as follows:

$$N_4 d_4 = 0.500 \lambda_i = 0.385 \lambda_0$$

(monitoring wavelength) $\lambda_4 = 392.7$ nm.

As noted above, this monitoring wavelength is beyond the visual spectrum and unless appropriate monitoring equipment is utilized to measure this reflectance, it is necessary to calculate the percent of reflectance versus the optical thickness per a design wavelength in the visual spectrum such as 510 nanometers. This information could be fed to a computer and the resulting signal from the comparator 52 can be compared with this information as will be described in more detail subsequently. When the particular reflectance level is monitored that corresponds to the desired optical thickness, the evaporation of the source material 16 is stopped. If the appropriate monitoring equipment is used, the adjusted $\lambda_i$ (392.7) can measure the maximum reflectance.

Figure 3:
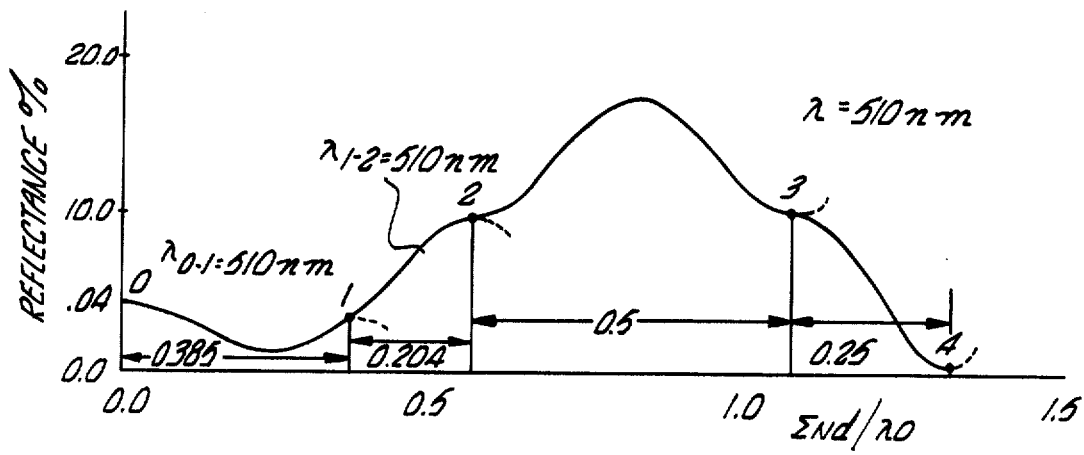
FIG. 3 is a plot of percent reflectance against the ratio of optical thickness and design wavelength.

Referring to FIG. 3, a reflectance curve 0–1 is disclosed for the first layer (4).

The material holder 14 is rotated for layer (3). This layer (3) is not an integer of a quarter wavelength of the design wavelength 510 nm since the optical design has not followed the classical approach. Being non-classical and having a $N_4 d_4$ non-quarter wavelength layer beneath, the desired optical thickness may not occur at either a maximum or minimum reflectance for $\lambda_0$. The monitoring reflectance $\lambda_3$ can be mathematically determined from the Vector diagram or computer more precisely taking into consideration the previously deposited layer (4). In the present example, $\lambda_3$ was found to have a maximum reflectance at 510 nm.

Accordingly, a monitoring filter 38 of $\lambda_{(3)}$ is positioned in front of the light source 34. The photoconductor monitor 40 receives the reflected light energy from the test substrate 30 and amplifier 44 amplifies the corresponding signal to indicate the maximum reflectance along the curve 1–2 shown in FIG. 3. An operator or computer can stop the depositing of the material at the maximum reflectance, point 2, to provide the desired optical thickness of 0.204 $\lambda_0$.

Again, the material holder 14 is rotated to provide the desired third source of material. The operative steps are repeated to deposit layer (2) which is shown as curve 2–3. The monitoring wavelength will be the design wavelength, 510 nanometers, and the photoconductor monitor 40 will monitor the reflectance of this wavelength from a minimum point through the maximum point to the second minimum point whereupon the depositing of the third material is halted by the operator or computer 56 to maintain an optical thickness of 0.500 $\lambda_0$.

For the final layer (1), the light source is still filtered to provide the design wavelength of 510 nanometers. The photo-conductor monitor 40 receives the reflected light energy from the test substrate 30 and amplifier 44 amplifies the corresponding electrical signal to indicate the minimum reflectance along the curve 3–4 shown in FIG. 3. The operator or computer stops the depositing of the material at the minimum reflectance point to provide the desired optical thickness.

To illustrate the process of the present invention, a non-classical optical design is presented in TABLE 2 for a four layer anti-reflective coating:

TABLE 2

| Layer | Film Index (N) | $N_i d_i$ | Monitor $\lambda_i$ |
|---|---|---|---|
| 1st | 1.385 | 0.250 $\lambda_0$ | 510 nm |
| 2nd | 2.150 | 0.484 $\lambda_0$ | 485 nm |
| 3rd | 1.615 | 0.184 $\lambda_0$ | 460 nm |
| 4th | 1.385 | 0.405 $\lambda_0$ | 413 nm |
| $N_s$ | 1.520 | | |

The monitoring wavelengths have been calculated as in the first example. The design wavelength $\lambda_0$ for the anti-reflective coating is 510 nanometers.

Figure 4:
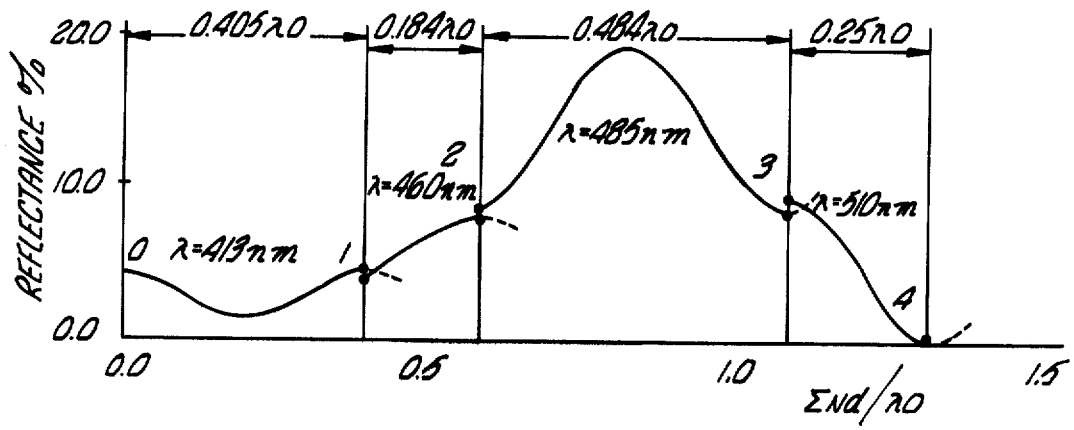
FIG. 4 is a plot of percent reflectance against the ratio of optical thickness and design wavelength.

Referring to FIG. 4, layer (4) is deposited using a monitoring filter of $\lambda_1 = 413$ nanometers. The depositing of material is halted at the maximum reflectance level as shown in curve 0–1.

Layer (3) is deposited after the appropriate change in material source and the change in the monitoring wavelength to 460 nm. The resulting curve 1–2 represents this layer. The gaps between the respective curves result from the respective changes in the monitoring wavelengths.

Layer (2) is represented by curve 2–3 with a monitoring wavelength of 485 nanometers.

Figure 5:
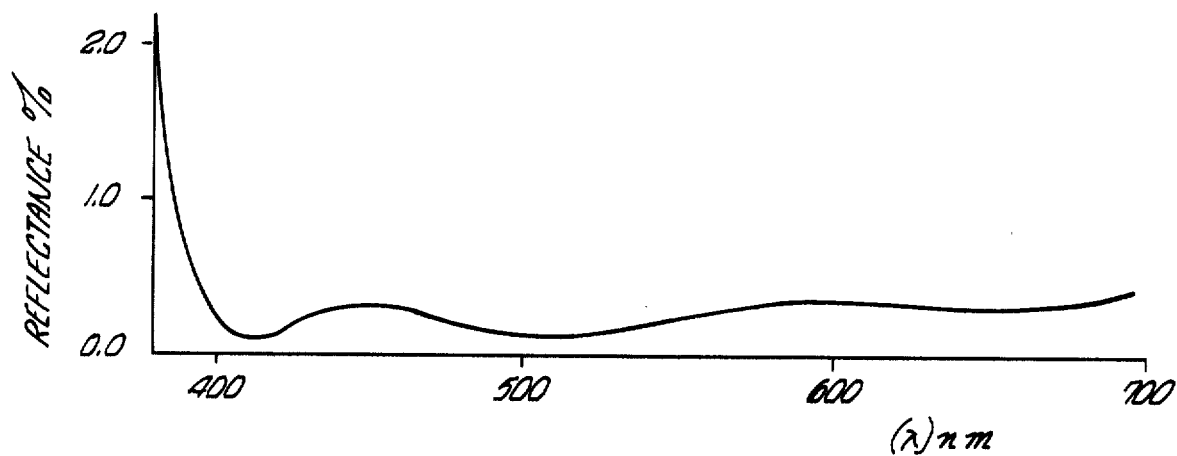
FIG. 5 is a plot of percent reflectance against wavelength across the visual spectrum for the coating of FIG. 4.
Figure 6:
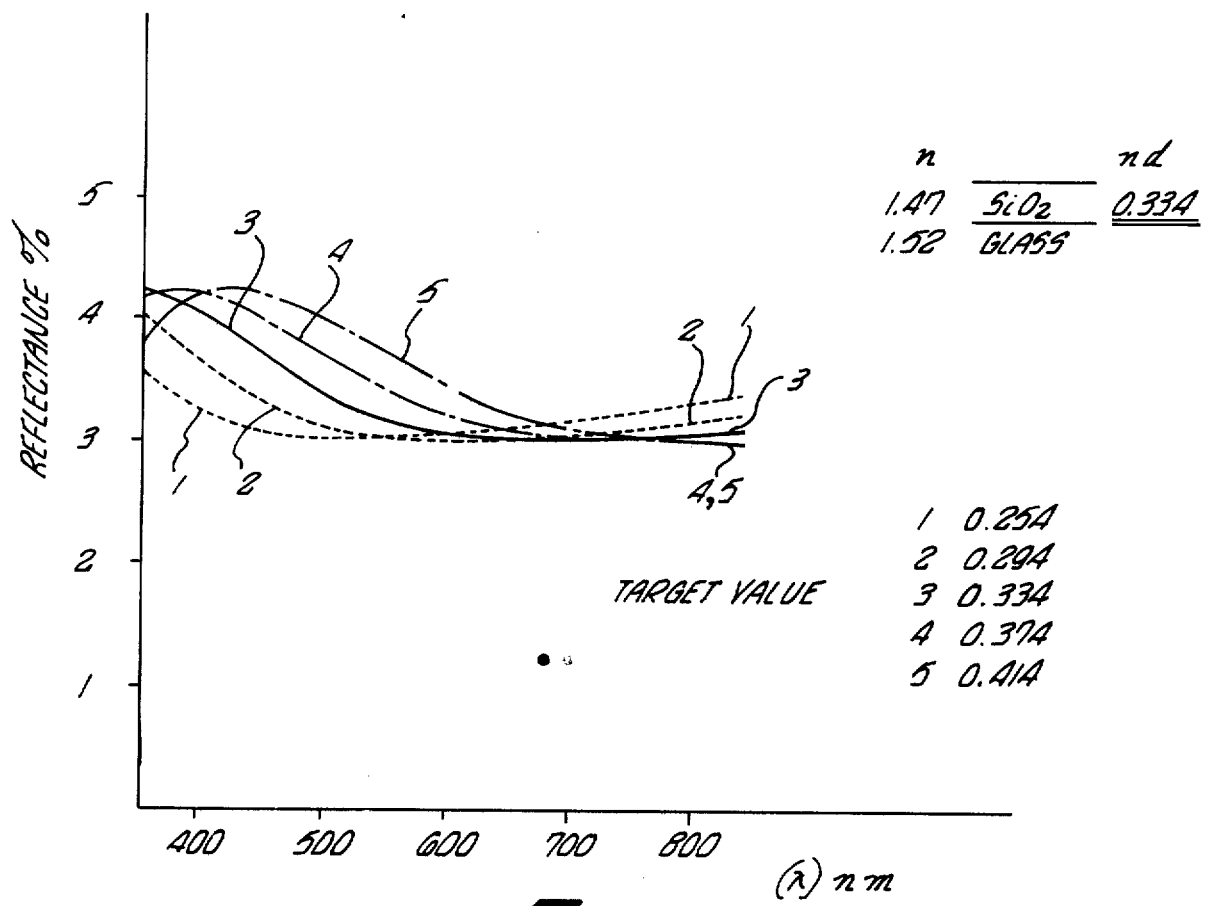
FIG. 6 is a plot of a series of curves of percent reflectance against wavelength across the visual spectrum.

Finally, the last layer (1) has an optical thickness of a quarter of the design wavelength and the design wavelength $\lambda_0$ (510 nm) was utilized to produce curve 3–4. The resulting reflectance curve of the composite four layer coating of FIG. 4 is shown in FIG. 5.

A five layer anti-reflective coating can be made with the same procedure except that an additional layer will be deposited.

In another embodiment of the present invention, which is preferred for the commercial production of optical lenses, a light source 60 shown in FIG. 2, provides a narrow light beam 62 emitting from a pin hole in a shield member 64. A 90° beam splitter 65 passes one light beam 67 and reflects another reference light beam 208 upward against a mirror surface 68.

A lens 70 collimates the light beam 67 onto a reflecting surface 72. The reflecting surface 72 is adjusted to aim the light beam downward against the test specimen 30. A portion 212 of the light beam 67 is reflected from the test specimen 30. The reflected portion 212 travels relatively upward and strikes another reflecting surface 74. Reflector 74 directs the reflected portion 212 to the input of a photomultiplier 204.

Photomultiplier 204 amplifies the reflected signal 212 in a known manner and converts that amplified signal into a corresponding electrical output signal. The electrical output signal from photomultiplier 204 is applied to an amplifier 216. Amplier 216 supplies one input signal to a difference amplifier 218.

Because source 60 is subject to deviations in intensity, it is necessary for the system to compensate for such deviations. It should be noted, for example, that the amount of reflected light 212 from specimen 30 is frequently relatively small. So small, in fact, that the deviations of source 60, if not compensated, can at times render the reflected portions 212 meaningless. In order to provide compensation for such deviations of light source 60, another photomultiplier 202 receives a reflected light beam 208 from reflector surface 68. This beam 208 is unimpeded in any manner and thus is representative of the intensity of light source 60 over the operating period in question. Photomultiplier 202 amplifies and converts this light signal 208 into an electrical signal that is amplified by amplifier 214 and is applied as a second input signal to difference amplifier 218. Any variation, or deviation, in source 60 is thus reflected in the strength of the light signal 208. Difference amplifier 218 will compensate for this deviation by supplying an absolute difference between the two light beams 208 and 212 in spite of deviations in intensity of source 60. Alternately, a mechanical chopper (not shown) rotating, for example, at 1000 Hz can replace the beam splitter 65 and reflect small segmented portions of the light beam 62 upward against the mirror surface 68. It would be possible with the chopper to provide an optical electrical system utilizing one detector for monitoring both the light source 60 and the light reflected from the test specimen 30.

As filter holder 84 rotates in front of source 60, a signal representative of the actual reflectance from substrate 30 is generated at the output of amplifier 218. This signal is an analog signal which varies during individual step functions as each transparent portion of filter 84 intercepts the light beam from source 60. Such an analog signal is shown as signal 900 in FIG. 10. When the various wavelength filters first begin to intercept the light from source 60 only a small portion of the light is first passed into the reflectance measuring equipment. The amount of light continues to increase in quantity as the individual filter rotates exactly into position in front of light source 60. As a given filter passes beyond the light source, the amount of light passed by the filter diminishes. In between the individual filters, of course, the light is blocked by the opaque surface of the filter holder housing. The blockage of light creates the deep valleys in signal 900 as shown in FIG. 10. As is apparent from a review of the waveform 900 of FIG. 10, the different wavelengths of the filter 84 result in different amounts of light being reflected. The amount of reflected light is proportional to the amplitude of the various individual step function waveforms, which amplitudes are designated by numerals bearing the same subscript as the filter that is responsible for the same.

In accordance with the principles of this invention, it is essential that the entire spectrum of all the wavelengths match (within a given tolerance range) the desired shape of a known and predetermined reflectance curve. In FIG. 11, the desired reference curve is shown in solid lines as reference curve 903. Above and below reference curve 903 are two companion curves 903A and 903B which define an envelope of ranges within which a reflectance curve for the coated surface is deemed acceptable. It is essential, however, that a signal indicative of the coated reflectance curve, fall within the shaded envelope of curve 903 at every point across the wavelength spectrum.

In order to assure the fact that the coated surface fits the acceptable tolerance ranges, the present invention samples the curve which is generated by the photomultiplier system as indicative of the coated surface at several sampling points. Any number of sampling points may be employed depending upon the resolution desired across the wavelength spectrum. A typical and simplified technique for generating sample pulses is depicted in the drawings. For example, as filter holder 84 rotates, a sampling pulse at substantially the center of each one of the filters $\lambda_1, \lambda_2, \lambda_3, \lambda_4, \lambda_5$ is generated and established at the output of synchronous motor 224. The repetitive cycle of pulses 905 from motor 224 is shown in FIG. 12. As there depicted, the pulses are substantially centered with the waveform outputs for the various different wavelengths each emitted by amplifier 218 at 220. Gate 222 of FIG. 2 is a logic gate which responds to the concurrence of an output signal from photomultiplier 202 and a sample pulse 905 to repeat the sample pulses 905 as gating signals for amplifier 226.

Amplifier 226 when gated on for the duration of a sample signal 905 samples each of the waveform signals of the wave 900 in FIG. 10. Each sampled waveform 907 as shown in FIG. 13 has an amplitude which is converted, via an analog-to-digital converter 820, to a respective digital signal of any desired number of bits. The number of bits again depends upon the desired resolution for the sampled signal.

Connected to the output of converter 820 is a comparator circuit 840. The comparator circuit receives a first sequence of digital words which together represent a digital representation of the reflectance curve for the coated surface. Source 850 emits a second sequence of digital words which are indicative of the desired, or reference, curve. Both the first and second sequences are applied to comparator 840. When both the reference curve and the curve indicative of the coated surface match one another (within the given degree of tolerances acceptable) then comparator 840 emits a coating finished signal to detector 860.

Figure 8:
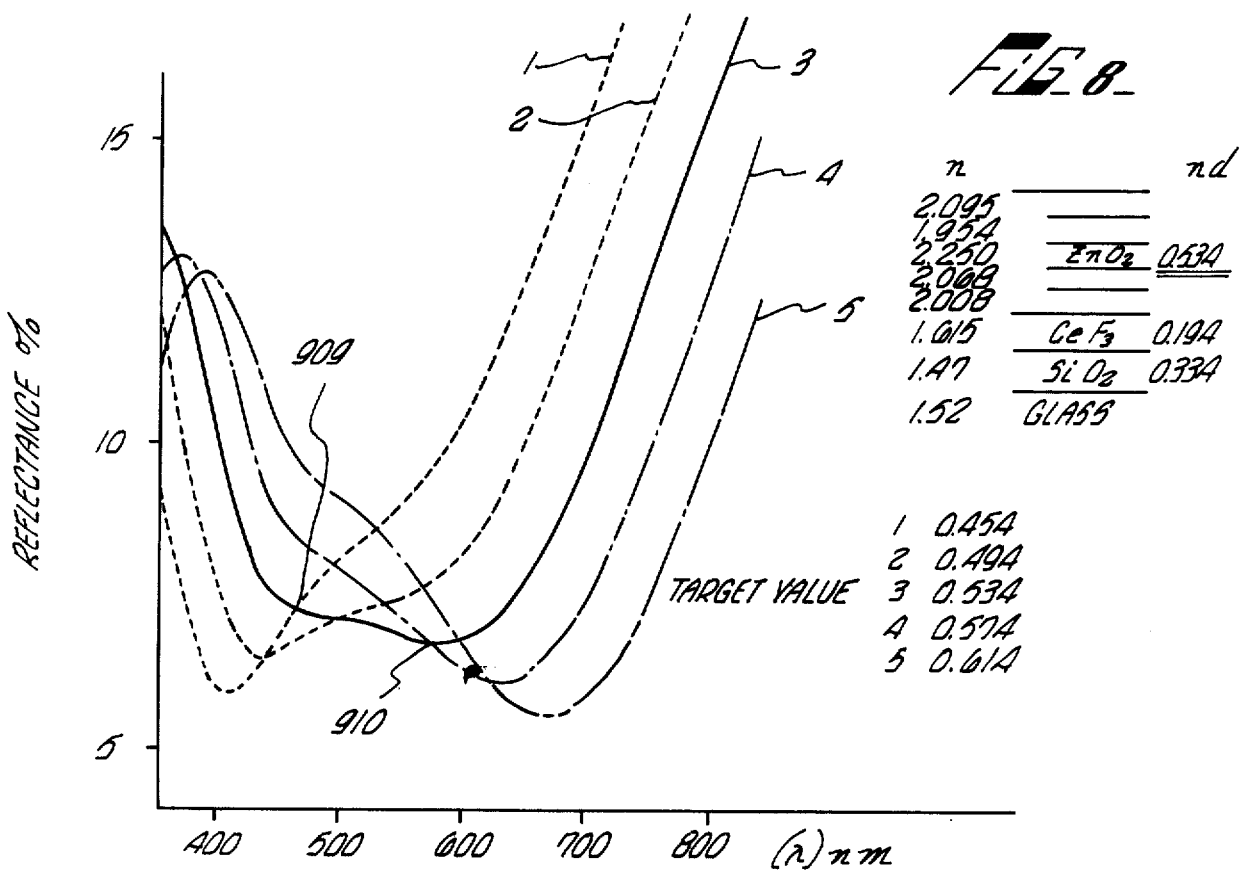
FIG. 8 is a plot of a series of curves of percent reflectance against wavelenth across the visual spectrum.
Figure 14:
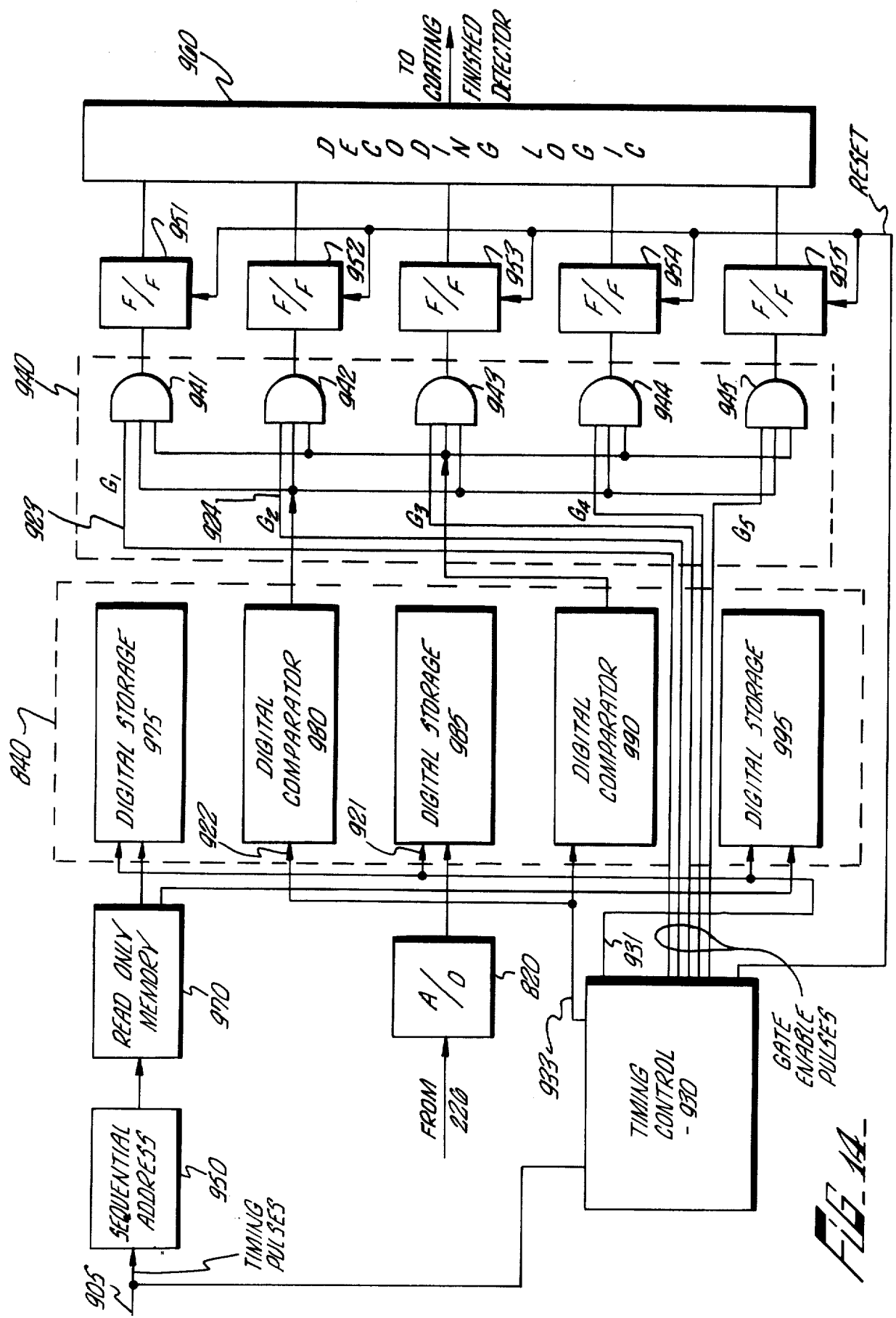
FIG. 14 is a schematic of a monitoring comparison circuit capable of being utilized in the present invention.

Numerous systems capable of achieving the above-described comparison operation may be employed. In FIG. 14, we have depicted a preferred embodiment wherein the comparison is done digitally based upon a repetitive sampling sequence. Before describing FIG. 14, a brief digression with reference to the curves of FIG. 8 is in order. The desired curve as shown in FIG. 8 is curve 3. That curve represents the target value, i.e., the amount of coating which is acceptable for all given wavelengths. The dashed curves 1 and 2 and the broken curves 4 and 5 represent various layers of coating which are alternately above and below the target value of curve 3. Accordingly, at the point designated 909, curve 1 crosses the desired target curve 3. It is apparent, however, that except for that the particular point, curve 1 is not at all close to the desired target curve. As additional material is deposited on the substrate, curve 2 becomes closer to the target curve but still does not match the target curve 3. If too much material is coated on the substrate, the reflectance curve as shown by curve 4 again crosses the target curve at point 910. Yet curve 4 does not match target curve 3. These various crossings of the target curve clarify the requirements that the curve representative of the coated substrate must match the target curve across the spectral bandwidth in question. It is not enough that the target curve and the coating curve intercept at one or two points. Instead, the coated technique must yield the desired target curve at all points across the spectral bandwidth so that the coating is stopped at precisely the right moment.

FIG. 14 depicts a system which is capable of emitting a signal when the coating should be stopped. Timing pulses 905 from FIG. 12 are applied as an input to a sequential address circuit 950. Address circuit 950 applies an address signal to a storage device 970. The storage device 970 may, for example, be a read only memory. The read only memory 970 when addressed reads out two digital words indicative of the limits of a desired target curve. With reference to the example given in FIG. 11, the pair of digital words indicative of the sample points for curve 903 are stored in the read only member 970. Thus, at sample time $T_1$ read only memory 970 is addressed by the address circuit 950 and two digital words indicative of the amplitudes 903A and 903B, as shown by arrow 901, are placed in digital storage registers 975 and 995. These storage registers form an operative part of the comparator 840 shown in dashed lines in FIG. 14.

The reference curve, indicative of the reflected light from amplifier 226, is applied to an analog-to-digital converter 820. The sampled analog amplitude 907A, FIG. 13, at time $T_1$ is applied to this analog-to-digital converter 820. A digital word is applied by converter 820 to a third digital storage register 985. Each digital word may include, for example, five or more binary bits depending upon the resolution desired for the system.

A timing control logic circuit 930 is synchronized by the occurrence of the sampled pulses 905 in FIG. 12. Timing control logic circuit 930 may be any suitable timing circuit as well known in the art capable of emitting the timing pulses described with respect to FIG. 14. In the example just given, a digital word emitted from the analog to digital converter 820 comprises five binary bits. Thus, the time $T_1$ in FIG. 13 sampled pulse 907 is converted into a five bit binary word. Timing control logic circuit 930 yields on lead 931 shift pulses 921. These pulses store the five bit signal indicative of the sampled amplitude 907 into the digital storage area 985. Control logic circuit 930 emits a pulse 922 subsequent to the shifting operation on lead 933 as seen in FIG. 15. This sampled pulse is applied to the digital comparator circuits 980 and 990.

The digital comparator circuits 980 and 990 in a manner described hereinafter will yield true output signals to NAND gates 941 through 945 of gate exchange 940 if the sampled signal and digital storage 985 compare properly with the digital signals in digital storage receivers 975 and 995 as straight true by read only memory 970. Substantially concurrent with the comparator pulse 922, timing control logic circuit 930 yields a gate enabling pulse such as gate enable pulse 923. Pulse 923 is the enable pulse for NAND gate 941. If the other inputs to NAND gate 941 are true when the enable pulse 923 is also true then and only then will NAND gate 940 be satisfied. At that moment a true level will be transferred to flip flop 951. Flip flop register 951 will store that true level and hold that true level until it is re-set by a subsequent re-set pulse 925 also transferred by timing control logic circuit 930. The individual gate enabling signals individually associated with the remaining NAND gates 942 and 945 as seen in FIG. 15 are also emitted by a timing control logic circuit 930. Accordingly, in the instance as just described the gate enabling signals will allow the NAND gates to designate their respective flip flops if the sample taken at the appropriate times were within the proper ranges; i.e., between 903a and 903b of FIG. 11.

At a sample time, $T_1$, the digital storage register 975 contains the lower amplitude value of curve 903B. If the sampled signal in register 985 (from the converter 820) is equal to or exceeds the value of the signal stored in storage register 985, then digital comparator 980 will emit a "true" signal of a given polarity. If on the other hand, the signal in register 985 is not equal to the value of the signal stored in register 975 then a "false" signal of opposite polarity is emitted by digital comparator 980.

It is also essential that the sampled value not equal or exceed the upper curve 903A without some indication of this event occurring. The second storage register 995 holds, at time $T_1$, a digital word that is representative of the value of the upper curve 903A at arrow 901. If the sampled coating signal in register 985 equals or exceeds the signal stored in register 995 a "false" signal is emitted.

Connected to receive the output signals from the comparators 980 and 990 is a gating exchange 940 shown in dashed lines. At the various sample times, exchange 940 gates either a "true" or a "false" signal into the storage flip-flop 951 through 955. The plurality of storage flip-flops 951 and 955 must all contain a "true" signal before the decoding logic 960 is satisfied. These flip-flops 951 and 955 are each responsive respectively to NAND gates 941 through 945. NAND gates 941 through 945 normally deliver a false signal to the respective flip-flop unless, at their sample time, the comparators 980 and 990 have presented a pair of true signals to their inputs.

Reference to FIGS. 11 through 15 shows that a comparison operation at sample time $T_1$ will yield a pair of true input signals to all of the NAND gates 941 through 945 if the coating curve is within the satisfactory dashed envelope curves 903A and 903B at the point indicated by arrow 901. None of the NAND gates except NAND gate 941 will respond because that gate is the only one that also receives a true input signal at time $T_1$ via the sample signal $S_1$. Accordingly, NAND gate 941 and flip-flop 951 are associated to indicate a satisfactory or unsatisfactory condition for wavelength $\lambda_1$, FIG. 10.

In a similar manner each of the remaining NAND gates 942 through 945 are associated with and indicate a satisfactory or unsatisfactory coating condition for wavelengths $\lambda_2$ through $\lambda_5$ respectively.

With respect to FIG. 2 a visual display 56 as shown in FIG. 1 can be connected to the analog-to-digital converter 830 and to the analog-to-digital converter 820 to provide a visual output of the measured spectral reflectance 57 to the predetermined target or reference curve 59.

The target curve 59 is generally mathematically or empirically computed as disclosed in the U.S. Pat. No. 3,781,090, issued Dec. 25, 1973, and represents the desired reflectance for a layer of a particular optical thickness across the visual spectrum.

The precalculated target curve can be generated from any appropriate signal source in much the same fashion as an analog-to-digital curve can be generated by a converter.

A cathode ray tube display device or spectrum analyzer provides a simultaneous display of the precalculated target curve 59 and the monitored signal curve 57 across the desired wavelength band. An example of an applicable spectrum analyzer that can be utilized is the Hewlett-Packard Co. Model No. 3580 Spectrum Analyzer. This analyzer can store a target curve trace 59 in a digital memory bank and permit both the stored target curve trace 59 and the measured reflectance input trace curve 57 to be displayed simultaneously. The characteristics of this known analyzer can be found in an article "Digital Storage Improves and Simplifies Analysis of Low Frequency Signals" by Weibel and Whatley, Electronics, June 21, 1973, pp. 116 to 120, which is incorporated herein by reference.

While not shown, it should be realized that if the measured reflectance input signal from the display amplifier (not shown) was digital then a line generator (not shown) could be utilized to draw lines between the discrete points to provide a visual continuous curve display as shown. A linear point connector circuit known in the prior art and disclosed in the above incorporated article can take the measured reflectance discrete input voltage levels and use them to generate connected line segments that can drive a Y-axis deflection amplifier (not shown). The number of filters on the rotating filter holder 84 will determine the discrete point readings of the measured curve 57 across the bandwidth range. In the illustrated embodiment, five monitoring wavelengths from 420 to 660 nanometers were utilized for illustration purposes. It should be realized that other forms of display devices can be utilized such as X-Y recorders. It is even possible to superimpose the precalculated target curve 59 over the display screen with a transparent mask.

The use of the rotating filter holder 84 should not be considered limiting in the present invention since it is possible to provide a series of monitoring wavelengths with either a spectrograph that could utilize a relatively movable prism or multi-wavelength laser light. The laser light has the advantage of a concentration of light energy in a precise position.

In the monitoring process steps described in the two embodiments of the present invention, we have assumed that the index of refraction for each layer is of a uniform structure. This is of particular importance in the first monitoring method where a synthetically derived monitoring wavelength is computed. It has been found, however, when utilizing metal oxides that the layers will frequently not provide a uniform structure.

It is believed that in a high vacuum depositing process that the molecular structure of the layer will vary apparently depending upon the availability of oxygen. Thus, many metal oxide films will disclose a graded index structure with respect to their optical thickness.

Attempts have been made in the prior art with some success such as in U.S. Pat. No. 3,604,784 to precisely control the feeding of oxygen into the bell jar 4 during the evaporation of the metal oxide. This procedure lowers the high vacuum and is believed to increase the porosity of the film structure.

However, even with the control of oxygen introduced into the bell chamber 4, many of the metal oxides will still have a varying or graded index structure.

It is possible, however, with a suitable design modification in the non-classical approach to utilize such a graded index structure in the optic design.

An example of a graded index metal oxide is $ZrO_2$. When a layer of $ZrO_2$ is evaporated without introducing any oxygen in a vacuum of $5 \times 10^{-5}$ torrs at a substrate temperature of 350°C, it appears that the metal oxide decomposes and will produce variations in the index of refraction. It is possible, however, to take this gradation of refraction into account in utilizing a non-classical design approach. Basically, we can divide the graded index layer into sublayers and with the assistance of a computer, derive the best combination of refractive indices to fit the measured spectral reflectance for different substrates. The structure of the indexed layer can be analyzed empirically by first measuring the spectral reflectance to determine the refractive index of each sublayer. This can be accomplished by dividing the total optical thickness of the graded index into, for example, five thin layers and letting the computer find the best combination of refractive indices to fit the measured spectral reflectance for, as an example, three different substrates, $N_s = 1.52$, $1.62$ and $1.72$. The computer is capable of matching the refractive index of the five layers using the damped least square method which is to minimize $$\Sigma\ W(\lambda)\ [R(\lambda) - R^*(\lambda)]^2$$

where
 $W(\lambda)$ is weighting function
 $R(\lambda)$ is calculated reflectance
 $R^*(\lambda)$ is measured reflectance.

By utilizing this computer method, it is possible to successfully integrate a graded index layer into the design parameters of the non-classical approach. The following TABLE 3 discloses a four layer non-classical design that includes graded index layers of $ZrO_2$ as follows:

TABLE 3

| Medium | Ref. Index | Optical thickness $\lambda_0 = 510$ nm. | |
|---|---|---|---|
| Air | | | |
| $MgF_2$ | 1.385 | 0.2510 $\lambda_0$ | |
| $ZrO_2$ | 2.095 | 0.1014 $\lambda_0$ | |
| | 1.954 | 0.1014 $\lambda_0$ | |
| | 2.250 | 0.1014 $\lambda_0$ | 0.534 $\lambda_0$ |
| | 2.068 | 0.1014 $\lambda_0$ | |
| | 2.008 | 0.1014 $\lambda_0$ | |
| $CeF_3$ | 1.615 | 0.1940 $\lambda_0$ | |
| $SiO_2$ | 1.470 | 0.3340 $\lambda_0$ | |
| substrate | 1.520 | | |

For illustrative purposes, the graphs in FIGS. 6 through 9 have been prepared to show the reflectance across the visual spectrum for optical thicknesses smaller than and greater than the desired design optical thickness. In actual practice the operator will stop the depositing of the material so that the particular layer will coincide with the target value optical thickness. The first layer is $SiO_2$ and Curve 1 represents the reflectance curve across the visual waveband for an optical thickness of 0.254. The second curve is for an optical thickness of 0.294 while the third curve is the target value or desired optical thickness for the layer $SiO_2$ of 0.334. Curve 4 represents an optical thickness of 0.374 while Curve 5 represents an optical thickness of 0.414. These curves (4 and 5) are only provided for illustration purposes and during the actual depositing of a coating layer would not be produced since they are beyond the design target value.

As can be seen from the graph, 684 nanometers would be the monitoring wavelength to read the minimum peak reflectance for a quarter $\lambda$ thickness on Curve 3. However, each of the Curves 1 through 5 produces about the same amount of reflectance at this wavelength. Accordingly, the relative difference is much greater at 450 nanometers. As can be seen from the graph of FIG. 6, at the peak minimum reflectance, the gradient of reflectance versus the wavelength is relatively small. By superimposing the predetermined target value on the display circuit screen 56 of FIG. 1, it is relatively simple for the operator to watch the measured reflectance curve progressively coincide with the target value Curve 3. Thus, the operator would observe the actual measured reflectance curve pass successfully through Curves 1 and 2 and align with the target value 3.

Figure 7:
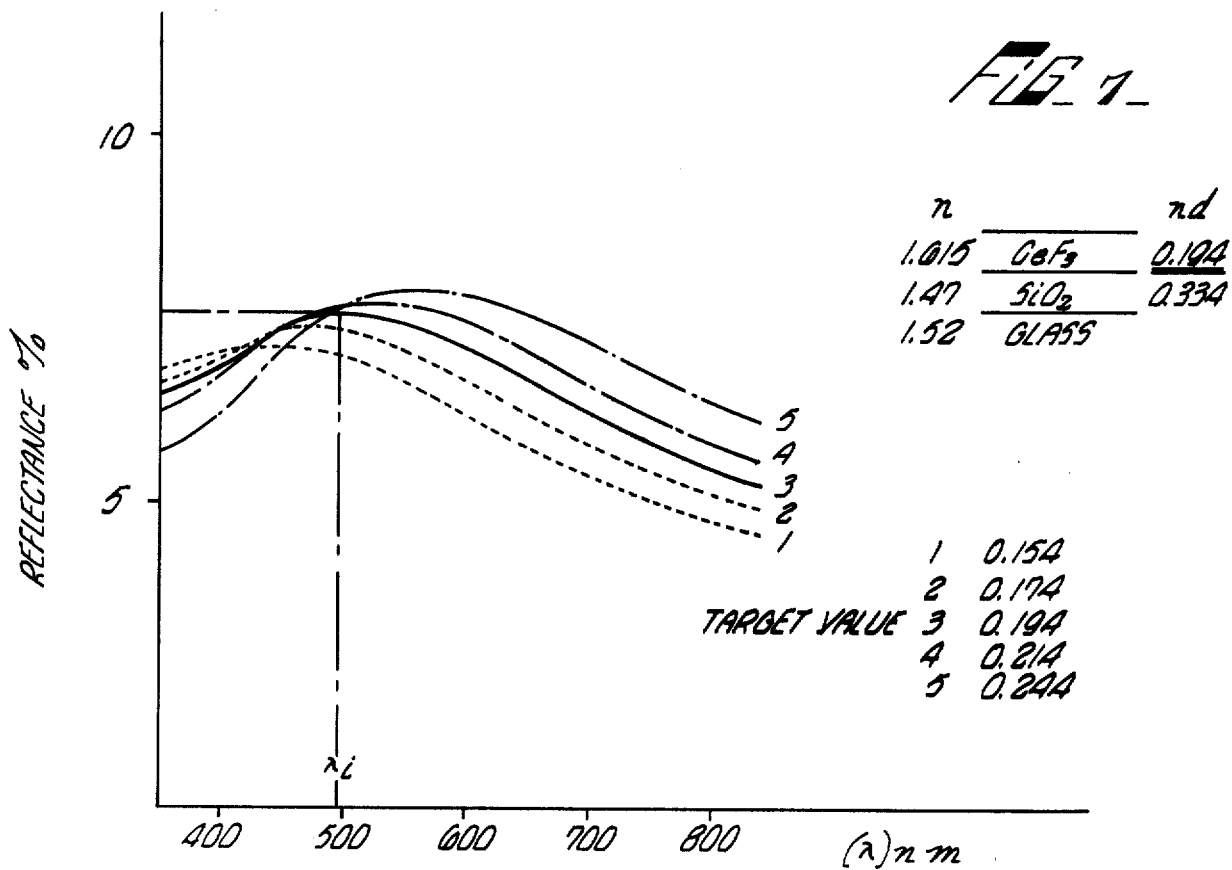
FIG. 7 is a plot of a series of curves of percent reflectance against wavelength across the visual spectrum.

FIG. 7 represents a series of curves for the third layer, $CeF_3$, from the air surface-coating inner face. Curve 1 represents an optical thickness of 0.154. Curve 2 represents an optical thickness of 0.174. Curve 3 represents the target or design optical thickness of 0.194. Curve 4 represents an optical thickness of 0.214 and Curve 5 represents an optical thickness of 0.244. As can be seen from the graph, the peak reflectance is roughly at 500 nanometers and as can be seen, it would be relatively simple to deposit too much material since there is a relatively small difference in the reflectance readings over the various optical thicknesses. However, by taking a series of readings at various wavelengths across the entire visual spectrum, it is relatively simple for the operator to watch the measured curve progressively pass through Curves 1 and 2 and merge with the desired target value Curve 3.

FIG. 8 represents the reflectance curves for various optical thicknesses of the second layer of $ZrO_2$. Curve 1 represents an optical thickness of 0.454. Curve 2 represents an optical thickness of 0.494. Curve 3 represents the desired design optical thickness of 0.534. Curve 4 represents an optical thickness of 0.574 while Curve 5 represents an optical thickness of 0.614. Again, it is a simple matter for the operator to watch the measured reflectance curve merge with the target Curve 3.

FIG. 9 represents the reflectance curves for the first or surface layer of $MgF_2$. Curve 1 represents an optical thickness of 0.211. Curve 2 represents an optical thickness of 0.231. Curve 3 represents an optical thickness of 0.251. Curve 4 represents an optical thickness of 0.271 while Curve 5 represents an optical thickness of 0.291. After the final layer of $MgF_2$ is deposited, the coated substrates 12 can be removed.

It should be realized that the monitoring method of the present invention showing a continuous curve across, for example, the entire visual spectrum, is highly adaptable to the non-classical design approach. For example, if there is an error in optical thickness of a particular layer because of a non-uniformity of index of reflection or even an operator error, it is a simple matter to recalculate a subsequent layer with a computer using the damped square method and thereby compensate and produce a commercially acceptable coating of thin film layers. It is even possible to empirically determine a probable degree of error and compute this correction into the projected target value curve. In addition, it is possible to derive a series of solutions about the target value curve to permit a compensation to be computed into these layers to be subsequently deposited if an error is determined.

Additional problems that exist in the manufacturing of multi-layer anti-reflective coatings can also be compensated for in determining the target value curve. For example, the aging effect can be taken into consideration. This aging effect is the difference in optical thickness recorded by the anti-reflective coating in a vacuum environment and after it is exposed to air. This effect can produce a variance of 10 percent or better in optical thickness. This aging effect is simply mentioned to show the versatility of the present invention in permitting various design parameters to be taken into account while still producing a commercially acceptable coating on a substrate. While the present invention has been described with respect to optical coatings it should be clear that other forms of reflective coatings can be successfully applied within the present invention. Likewise, the particular arrangement of equipment can also be varied. For example, the light that passes through the substrate rather than the reflected light can be monitored and other forms of comparators and gating arrangements could be utilized.

Another variation of the present invention disclosed in FIG. 2 can be accomplished by eliminating the rotating filter 84, the light intensity control elements, e.g. 68, 202 and 214, and the timing circuit, e.g. 222 and 224. The intensity of the monitoring light beam 67 can be adequately controlled, for our purposes, by a light control circuit (not shown) such as a sylister control sold by General Electric Company as a SOLID STATE PHASE CONTROL, Model S–300 series. The source for producing a variable wavelength of light energy across the visual spectrum can be provided by a spectrograph (not shown) consisting of a number of optically dispersive elements such as an optical prism or grating and an imaging lens.

The photomultiplier 204 would be preferably replaced with a solid state line scanner such as the Reticon Corporation, RETICON model RL–64 or General Electric Company, self-scanning multidiode detector C.C.D.–101. The self scanning multidiode detector (not shown) can receive the monitored reflectance across the entire visual spectrum and provide an output signal which can be connected directly to an oscilloscope for visual display or connected to the analog to digital converter 820 for computer processing.

It should be noted that various modifications can be made to the apparatus while still remaining within the purview of the following claims.

What is claimed is:

1. A monitoring system for controlling the depositing of a layer of material on a substrate comprising:
    a source for producing a beam of energy having a variable wavelength across a predetermined range;
    means receiving at least a portion of the beam of energy after it has contacted the material on the substrate for providing corresponding monitoring signals across the predetermined range representative of the material deposited on the substrate;
    means for comparing the corresponding monitoring signals with a predetermined range of values representing a desired thickness of material; and
    means for indicating when each of the monitoring signals are respectively matched with predetermined values whereby the desired thickness of material has been deposited on the substrate including a visual display screen for displaying both the monitoring signals and the predetermined range of values.

2. A monitoring system for controlling the depositing of a layer of material on a substrate comprising:
    means for producing a beam of energy having a variable wavelength including a source of energy for providing a multi-wavelength beam and a plurality of interference filters rotatably mounted for filtering the beam;
    means receiving at least a portion of the beam energy after it has contacted the material on the substrate for providing corresponding monitoring signals across the predetermined range representative of the material deposited on the substrate;
    means for comparing the corresponding monitoring signals with a predetermined range of values representing a desired thickness of material; and
    means for indicating when each of the monitoring signals are respectively matched with predetermined values whereby the desired thickness of material has been deposited on the substrate.

3. The invention of claim 2 further including means for receiving a portion of the beam of energy before it contacts the substrate and providing a corresponding reference signal indicative of the source that produces the beam of energy.

4. The invention of claim 3 wherein the means for receiving a portion of the beam of energy includes a beam splitter in the path of the energy beam and a photo-multiplier.

5. The invention of claim 3 further including means for comparing the source reference signal with the monitoring signals to eliminate any variations in intensity of the monitoring signals caused by any variations in intensity of the source.

6. The invention of claim 5 wherein the means for comparing the source reference signal with the monitoring signals includes a differential amplifier.

7. A monitoring system for controlling the depositing of a layer of material on a substrate comprising:
    a source for producing a beam of energy having a variable wavelength across a predetermined range;
    means for receiving a portion of the beam of energy before it contacts the substrate and providing a corresponding source reference signal indicative of the source that produces the beam of energy;
    means for receiving at least a portion of the beam of energy after it has contacted the material on the substrate for providing corresponding monitoring signals, across the predetermined range representative, of the material deposited on the substrate;
    differential amplifier means for comparing the source reference signal with the monitoring signals to eliminate any variations in intensity of the monitoring signals caused by any variations in intensity of the source;

means for comparing the corresponding monitoring signals with a predetermined range of values representing a desired thickness of material; and means for indicating when each of the monitoring signals are respectively matched with predetermined values whereby the desired thickness of material has been deposited on the substrate.

8. A method of manufacturing a multi-layered optical coating on a lens substrate comprising the steps of:

enclosing at least one lens substrate in a sealed housing;

depositing a layer of coating material on the substrate;

simultaneously directing from a source of energy a beam of energy having a variable wavelength across a predetermined range so that it contacts the coating material on the substrate;

monitoring at least a portion of the beam of energy after it contacts the coating material on the substrate to produce a plurality of corresponding monitoring signals across the wavelength range;

comparing the monitoring signals with a predetermined range of values corresponding to the desired optical thickness of the coating layer; displaying the monitoring signals and the predetermined range of values simultaneously on a visual display screen; and stopping the deposition of coating material when each of the monitoring signals correspond to its respective predetermined value.

9. The invention of claim 8 wherein the means for indicating when each of the corresponding monitoring signals are respectively matched with predetermined values includes a visual display screen for displaying both the monitoring signals and the predetermined range of values.

10. The invention of claim 8 wherein the means for indicating when each of the corresponding monitoring signals are respectively matched with predetermined values includes a computer comparison circuit for comparing the reference predetermined values with the monitoring signals.

11. The invention of claim 8 wherein the means for producing a beam of energy having a variable wavelength includes a source of energy for providing the beam and a plurality of interference filters rotatably mounted for filtering the beam.

12. The invention of claim 8 wherein the means for providing corresponding signals includes a photomultiplier.

13. A method of manufacturing a multi-layered optical coating on a lens substrate having a predetermined design optical thickness value for each layer of coating comprising the steps of:

a. enclosing at least one lens substrate in a housing;

b. depositing a layer of coating material, having a relatively variable index of refraction compared to one fixed theoretical value, on the substrate;

c. simultaneously directing from a source of energy a beam of energy having a variable wavelength across a predetermined range so that it contacts the coating material on the substrate;

d. monitoring at least a portion of the beam of energy after it contacts the coating material on the substrate to produce a plurality of corresponding monitoring signals across the wavelength range;

e. comparing the monitoring signals with a predetermined range of values corresponding to the desired optical thickness of the coating layer within the parameters of the theoretical design multi-layered optical coating;

f. stopping the deposition of coating material when each of the monitoring signals correspond as close as possible to the respective predetermined value of the design layer;

g. determining any variances between the monitoring signals and the predetermined design values;

h. adjusting the predetermined range of values for the optical thickness of at least one subsequent layer of coating material to compensate for any actual variations in the preceding layer from its design predetermined optical thickness value;

i. depositing a subsequent layer of coating material having a different index of refraction than the preceding layer;

j. simultaneously directing from a source of energy a beam of energy having a variable wavelength across a predetermined range so that it contacts the coating material on the substrate;

k. monitoring at least a portion of the beam of energy after it contacts the coating material on the substrate to produce a plurality of corresponding monitoring signals across the wavelength range;

l. comparing the monitoring signals of the subsequent layer with the adjusted predetermined range of values corresponding to the adjusted desired optical thickness; and m. stopping the deposition of the subsequent layer of coating material when each of the monitoring signals correspond to the respective adjusted predetermined range of values corresponding to the adjusted desired optical thickness.

14. The invention of claim 13 further including the step of displaying the monitoring signals and the predetermined range of values simultaneously on a visual display screen.

15. The invention of claim 14 further including the step of monitoring at least a portion of the beam of energy before it contacts the coating material on the substrate to provide a reference signal indicative of the condition of the source of energy.

16. The invention of claim 15 further including the step of comparing the source reference signal and the monitoring signals to provide secondary monitor signals that are independent of any fluctuation in the source, the secondary monitor signals are subsequently compared with the predetermined range of values.

17. A method of monitoring the deposition of a layer of material onto a substrate to form an anti-reflecting coating of a set optical thickness over a predetermined wavelength range about a design wavelength in accordance with a non-classical optical design comprising the steps of:

providing a source for producing a beam of light;

directing the light beam towards the material being deposited on the substrate to contact the material;

varying the wavelength of the light beam from the design wavelength to a monitoring wavelength that would provide an extreme limit of reflection for the desired set optical thickness of the non-classical optical coating;

receiving the monitoring wavelength after it contacts the coating layer and providing a representative signal; and indicating when the representative signal is at the extreme limit of reflection for the desired optical thickness, whereby the depositing of the material can be stopped.

18. The invention of claim 17 wherein the wavelength is varied to provide the maximum reflection at the desired optical thickness.

19. The invention of claim 17 wherein the wavelength is varied to provide the minimum reflection at the desired optical thickness.

* * * * *

UNITED STATES PATENT AND TRADEMARK OFFICE
CERTIFICATE OF CORRECTION

PATENT NO. : 3892490
DATED : July 1, 1975
INVENTOR(S) : Toshio Uetsuki; Mitsuo Okajima; Yoshio Yuasa It is certified that error appears in the above-identified patent and that said Letters Patent are hereby corrected as shown below:

Column 2, line 17, delete $\lambda 14$ and insert ---$\lambda/4$---.

Signed and Sealed this thirtieth Day of December 1975

[SEAL]

Attest:

RUTH C. MASON
*Attesting Officer*

C. MARSHALL DANN
*Commissioner of Patents and Trademarks*